UNITED STATES PATENT OFFICE.

MINER L. HARTMANN, OF NIAGARA FALLS, NEW YORK, ASSIGNOR TO THE CARBORUNDUM COMPANY, OF NIAGARA FALLS, NEW YORK, A CORPORATION OF PENNSYLVANIA.

REFRACTORY MATERIAL.

1,376,091. Specification of Letters Patent. Patented Apr. 26, 1921.

No Drawing. Application filed May 17, 1920. Serial No. 381,955.

*To all whom it may concern:*

Be it known that I, MINER L. HARTMANN, a citizen of the United States, residing at Niagara Falls, county of Niagara, and State of New York, have invented a new and useful Improvement in Refractory Materials, of which the following is a full, clear, and exact description.

This invention relates to a new highly refractory material, and more particularly to a refractory material consisting mainly of a refractory material consisting mainly of carborundum, held together by a bond consisting essentially of a mixture of zirconium and aluminum silicates.

The object of my invention is to provide a refractory material of this character which will possess greatly improved qualities in the respects more particularly hereinafter described.

Carborundum is recognized as a highly refractory material, but in order to be used commercially, the grains of carborundum must be held together in the desired shapes by some bonding material.

Various materials such as mixtures of clays, oxids and sodium silicate have been proposed and used for this purpose, but the usefulness as refractories of the products so formed is restricted by the temperature at which the bond softens or fuses. Other materials of high refractability which might be used as a bond for carborundum refractories require to be burned at extremely high temperatures during manufacture into the required shapes, so that their use is very limited or excluded. The ideal bonding material from an economical production viewpoint is one with a very long, and at the same time high vitrification range; that is, the bonding material must bind the carborundum particles together at a readily obtainable temperature, (for example about 1350° centigrade, which is commonly obtained in large kilns for burning certain ceramic ware) and the bond must not thoroughly fuse or become fluid until extremely high temperatures are reached, which permits the use of the articles at a much higher temperature than that of the burning.

In addition to the long vitrification range, it is important to have a slight surface reaction between the carborundum particles and the bonding material which will take place at the temperature of burning of the refractory articles. This increases the bonding strength between particles and firmly binds the body together.

Zirconium oxid, on account of its very high fusion point, has previously been proposed as a refractory material to be used with carborundum. However, great difficulty has been encountered in the commercial application of zirconium oxid or zirconia as a refractory, because the material must be burned at temperatures much higher than those ordinarily used in the manufacture of refractory materials.

I have discovered that highly refractory carborundum articles may be made by molding and burning in the usual ways mixtures of carborundum and a bond composed of zirconium and aluminum silicates in varying proportions. Such a bonding material has the desired properties of long and high vitrification range and gives a desirable surface reaction and consequent high bonding strength with carborundum.

As an illustration of the method of practising my invention, I may take carborundum 95 parts and bonding material 5 parts. The bonding material may be composed, for example, by weight, of 90 parts zirconium silicate and 10 parts of aluminum silicate. The carborundum is run-of-mill crystalline product containing particles from 14 mesh to the finest powders. The bonding material which I prefer to use is made by grinding to an extremely fine powder suitable mixtures of commercial zirconium and aluminum silicate minerals to give the desired properties, one such composition being as given. The impurities such as oxid of iron, titanium, calcium, etc., which occur in natural mineral products, if present in small amounts, do not destroy the desired properties of the bond and may be present. After thorough mixing of the bonding material and the carborundum, the mixture is tamped or pressed by well known methods into the desired shapes, which are then fired in a kiln to approximately 1350° C.

An article is thus produced which has the desired properties of very high refractability, great mechanical strength, and exceptional freedom from spalling. Such articles may be successfully used at temperatures much higher than the burning temperature, thus providing a suitable method of utilizing the extreme refractability of carborundum in shaped refractory articles.

That a surface reaction occurs between this bonding material and the surface of the carborundum grains with a consequent greatly improved bonding strength, may be proven by microscopic examination of the carborundum grains after the bonding material has been removed by suitable chemical means from pieces which have been burned in the kiln.

I have described one illustrative application of my invention, but I desire it to be known that I do not limit myself to this particular composition, as other mixtures will give the desired properties. Preferably, however, in all cases, the carborundum should constitute at least 80% of the mixture.

Neither do I limit myself to the described method of producing the bonding material. The specific terms which are employed are used only in a descriptive sense and not for the purpose of limitation.

I claim:
1. A refractory article containing carborundum and a bonding material containing mixtures of zirconium and aluminum silicates.
2. A refractory article containing at least 80% carborundum and a bonding material containing mixtures of zirconium and aluminum silicates.
3. A refractory article containing mainly carborundum and a bonding material containing mixtures of zirconium and aluminum silicates, said bonding material possessing a long and high vitrification range.
4. A refractory article containing mainly carborundum and a bonding material containing mixtures of naturally occurring zirconium and aluminum silicates, said bonding material possessing a long and high vitrification range.

In testimony whereof, I have hereunto set my hand.

MINER L. HARTMANN.